(12) United States Patent
Hennessy

(10) Patent No.: US 8,277,964 B2
(45) Date of Patent: Oct. 2, 2012

(54) SYSTEM AND METHOD FOR OPTIMIZING EFFICIENCY AND POWER OUTPUT FROM A VANADIUM REDOX BATTERY ENERGY STORAGE SYSTEM

(75) Inventor: Timothy David John Hennessy, Portland, OR (US)

(73) Assignee: JD Holding Inc., George Town, Grand Cayman (KY)

( * ) Notice: Subject to any disclaimer, the term of this patent is extended or adjusted under 35 U.S.C. 154(b) by 2575 days.

(21) Appl. No.: 11/032,280

(22) Filed: Jan. 10, 2005

(65) Prior Publication Data
US 2005/0158614 A1    Jul. 21, 2005

Related U.S. Application Data

(60) Provisional application No. 60/536,662, filed on Jan. 15, 2004, provisional application No. 60/541,534, filed on Feb. 3, 2004.

(51) Int. Cl.
*H01M 10/42* (2006.01)
*H01M 10/50* (2006.01)
*G05F 1/00* (2006.01)

(52) U.S. Cl. ......... 429/62; 429/61; 429/105; 429/231.5; 700/297

(58) Field of Classification Search ........................ None
See application file for complete search history.

(56) References Cited

U.S. PATENT DOCUMENTS

| | | | |
|---|---|---|---|
| 3,530,003 A | 9/1970 | Warszawski et al. | |
| 3,996,064 A | 12/1976 | Thaller | 320/2 |
| 4,362,791 A | 12/1982 | Kaneko et al. | 429/101 |
| 4,786,567 A | 11/1988 | Skyllas-Kazacos et al. | 429/19 |
| 4,956,244 A | 9/1990 | Shimizu et al. | 429/17 |
| 5,250,158 A | 10/1993 | Kaneko et al. | 204/86 |
| 5,318,865 A | 6/1994 | Kaneko et al. | 429/193 |
| 5,368,762 A | 11/1994 | Sato et al. | 252/62.2 |
| 5,587,132 A | 12/1996 | Nakajima et al. | 423/62 |
| 5,656,390 A | 8/1997 | Kageyama et al. | 429/44 |
| 5,665,212 A | 9/1997 | Zhong et al. | 304/297 R |
| 5,759,711 A | 6/1998 | Miyabayashi et al. | 429/15 |
| 5,851,694 A | 12/1998 | Miyabayashi et al. | 429/105 |
| 6,143,443 A | 11/2000 | Kazacos et al. | 429/204 |
| 6,461,772 B1 | 10/2002 | Miyake et al. | 429/247 |
| 6,468,688 B2 | 10/2002 | Kazacos et al. | 429/101 |

(Continued)

FOREIGN PATENT DOCUMENTS

WO    WO 9003666 A1 *  4/1990

(Continued)

OTHER PUBLICATIONS

Definition of "Load" retrieved from Dictionary.com on Aug. 12, 2010.*

(Continued)

*Primary Examiner* — R. Hodge
(74) *Attorney, Agent, or Firm* — John R. Thompson; Stoel Rives LLP (57) ABSTRACT

An energy storage system includes a vanadium redox battery that interfaces with a control system to optimize performance and efficiency. The control system calculates optimal pump speeds, electrolyte temperature ranges, and charge and discharge rates. The control system instructs the vanadium redox battery to operate in accordance with the prescribed parameters. The control system further calculates optimal temperature ranges and charge and discharge rates for the vanadium redox battery.

18 Claims, 6 Drawing Sheets

U.S. PATENT DOCUMENTS

| | | | |
|---|---|---|---|
| 6,475,661 B1 | 11/2002 | Pellegri et al. | |
| 6,519,041 B1* | 2/2003 | Berthold | 356/477 |
| 6,562,514 B1 | 5/2003 | Kazacos et al. | 429/204 |
| 6,563,234 B2 | 5/2003 | Hasegawa et al. | 307/66 |
| 6,613,298 B2 | 9/2003 | Tanaka et al. | 423/62 |
| 6,761,945 B1 | 7/2004 | Adachi et al. | 428/36.1 |
| 6,764,789 B1 | 7/2004 | Sekiguchi et al. | 429/105 |
| 2003/0143456 A1 | 7/2003 | Kazacos et al. | 429/105 |
| 2004/0172943 A1* | 9/2004 | Buelow et al. | 60/527 |
| 2004/0191623 A1 | 9/2004 | Kubata et al. | 429/189 |
| 2005/0012395 A1* | 1/2005 | Eckroad et al. | 307/44 |
| 2005/0077252 A1* | 4/2005 | Shih et al. | 210/767 |
| 2005/0158615 A1 | 7/2005 | Samuel et al. | |

FOREIGN PATENT DOCUMENTS

| | | |
|---|---|---|
| WO | WO 95/12219 | 5/1995 |
| WO | WO 03/092109 A1 | 11/2003 |

OTHER PUBLICATIONS

Definition of "Electrical Power" retrieved from Dictionary.com on Aug. 12, 2010.*

Bartolozzi, M., "Development of Redox Flow Batteries. A Historical Bibliography," Journal of Power Sources, 27 (1989), pp. 219-234.

Sum, et al., "A Study of the V(II)/V(III) Redox Couple for Redox Flow Cell Applications," Journal of Power Sources, 15 (1985), pp. 179-190.

Skyllas-Kazacos et al., "Characteristics and performance of 1 kW UNSW vanadium redox battery," Journal of Power Sources, 35 (1991) pp. 399-404.

Skyllas-Kazacos, et al., "Vanadium redox battery prototype: design & development," University of New South Wales, Department of Minerals and Energy, Jan. 1991, 254 pgs.

Kazacos, Michael, "Electrolyte Optimization and Electrode Material Evaluation for the Vanadium Redox Battery," a thesis submitted as part of the requirements for the degree of Master of Science, School of Chemical Engineering and Industrial Chemistry, The University of New South Wales, Feb. 1989, 250 pgs.

Skyllas-Kazacos, et al., "Development of Redox Cell for Remote Area Energy Storage," School of Chemical Engineering & Industrial Chemistry, University of New South Wales, 200 pgs.

PCT International Search Report, PCT/US05/36041, mailed Jul. 31, 2007, 3 pages.

Written Opinion of the International Searching Authority, PCT/US05/36041, mailed Jul. 31, 2007, 5 pages.

International Search Report for PCT/US07/14277 filed Jun. 18, 2007, mailed on Aug. 18, 2008, 4 pgs.

Written Opinion of the International Searching Authority for PCT/US07/14277 filed Jun. 18, 2007, mailed on Aug. 18, 2008, 4 pgs.

* cited by examiner

SYSTEM AND METHOD FOR OPTIMIZING EFFICIENCY AND POWER OUTPUT FROM A VANADIUM REDOX BATTERY ENERGY STORAGE SYSTEM

RELATED APPLICATIONS

This application claims priority to U.S. Patent Application No. 60/536,662 filed on Jan. 15, 2004 and titled "System and Method for Optimizing Efficiency and Power Output from a Vanadium Redox Battery Energy Storage System" and to U.S. Patent Application No. 60/541,534 filed on Feb. 3, 2004, and titled "System and Method for Optimizing Efficiency and Power Output from a Vanadium Redox Battery Energy Storage System."

TECHNICAL FIELD

This invention relates to vanadium redox battery energy storage systems and associated automated control systems to enhance performance.

BACKGROUND OF THE INVENTION

Domestic and industrial electric power is generally provided by thermal, hydroelectric, and nuclear power plants. New developments in hydroelectric power plants are capable of responding rapidly to power consumption fluctuations, and their outputs are generally controlled to respond to changes in power requirements. However, the number of hydroelectric power plants that can be built is limited to the number of prospective sites. Thermal and nuclear power plants are typically running at maximum or near maximum capacity. Excess power generated by these plants can be stored via pump-up storage power plants, but these require critical topographical conditions, and therefore, the number of prospective sites is determined by the available terrain.

New technological innovations and ever increasing demands in electrical consumption have made solar and wind power plants a viable option. Energy storage systems, such as rechargeable batteries, are an essential requirement for remote power systems that are supplied by wind turbine generators or photovoltaic arrays. Energy storage systems are further needed to enable energy arbitrage for selling and buying power during off peak conditions.

Vanadium redox energy storage systems have received very favorable attention, as they promise to be inexpensive and possess many features that provide for long life, flexible design, high reliability, and low operation and maintenance costs. A vanadium redox energy storage system include cells holding anolyte and catholyte solutions separated by a membrane.

The vanadium redox energy storage system relies on a pumping flow system to pass the anolyte and catholyte solutions through the cells. In operating a vanadium redox energy storage system, flow rates, internal temperatures, pressure, charging and discharging times are all factors that influence power output. Thus, it would be an advancement in the art to provide a system and method for optimizing the efficiency of a vanadium redox energy storage system.

BRIEF DESCRIPTION OF THE DRAWINGS

A more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

A vanadium redox battery energy storage system, hereinafter referred to as VRB-ESS, includes all sizes of vanadium redox batteries (VRB) in both absolute KVA rating and energy storage duration in hours. The VRB-ESS includes storage reservoirs to hold vanadium electrolyte, an energy conversion mechanism defined as a cell, a piping and pumping flow system, and a power conversion system (PCS).

The VRB-ESS is in electrical communication with a control system that monitors and controls aspects of the performance of the components of the VRB-ESS. The control system may be implemented in any number of ways but, in one embodiment, includes a control program running on a suitable platform, such as programmable logic controller, microprocessor, or the like. The control system controls and manages the performance of the VRB-ESS in such a manner as to optimally meet the fundamental parameters of efficiency and safe operation. The control system further provides for self protection in the event of an external or internal fault or failure of a critical component, accurate controlled output as determined by dynamic load requirements or preset performance thresholds, and ambient conditions prevailing from time to time in each cycle.

The present invention provides a system and method for optimally controlling the power output, charging and discharging times, and efficiency of a VRB-ESS or any system that uses vanadium based electrolyte solution as the energy storage component of a battery. There are several key parameters which control the operation of a VRB. For any given concentration of electrolyte solution, the key parameters include temperature, volumetric flow rates, pressure within and across the cell stacks, and state of charge of the electrolyte and load as evidenced by the current drawn or supplied. The load may be seen as positive or negative. If negative, then the load is actually supplying power to the VRB. All of these parameters change in a dynamic manner continuously and vary with age.

In order to optimize the overall performance of the VRB, the present invention employs a control system provides algorithms with control strategies. The control system allows the VRB-ESS to operate in an automatic mode to ensure that the highest possible efficiency is achieved as measured from the alternating current input to alternating current output on a round trip basis. The control system adjusts according to the age of the VRB-ESS or as dynamic changes in any of the components occurs. The control system provides optimized efficiency by controlling the charging and discharging, pump flow rates, and associated pressures within the VRB-ESS.

Figure 1:
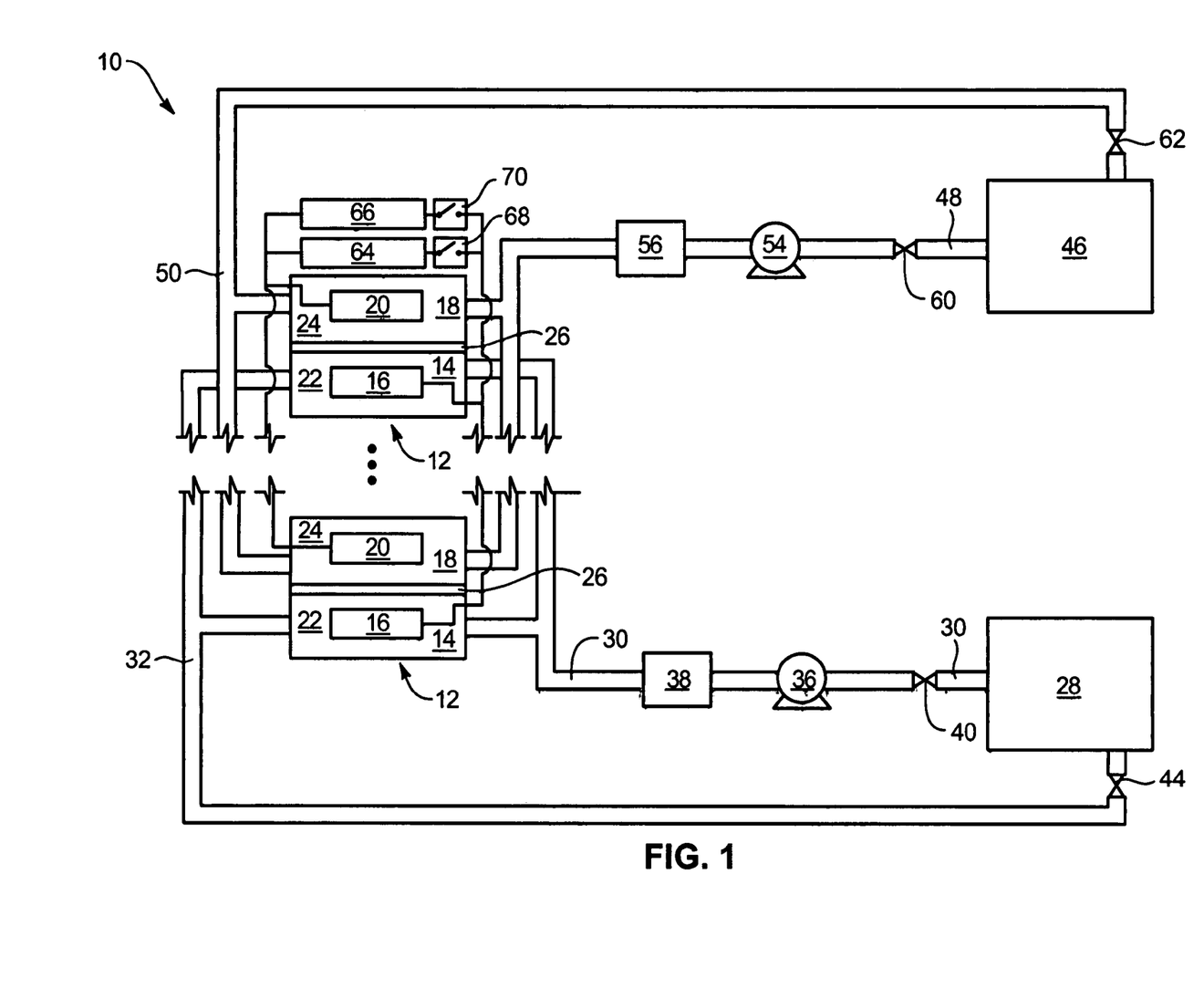
FIG. 1 is a block diagram of an embodiment of a vanadium redox battery energy storage system.

Referring to FIG. 1, a block diagram of a VRB-ESS 10 for use with the present invention is shown. A suitable energy storage system is required for remote power system applications that are supplied by either photovoltaic arrays or wind turbine generators. For such applications, low life-cycle cost and simplicity of operation are major requirements.

The system 10 includes one or more cells 12 that each have a negative compartment 14 with a negative electrode 16 and a positive compartment 18 with a positive electrode 20. Suitable electrodes include any number of components known in the art and may include electrodes manufactured in accordance with the teachings of U.S. Pat. No. 5,665,212, which is hereby incorporated by reference. The negative compartment 14 includes an anolyte solution 22 in electrical communication with the negative electrode 16. The anolyte solution 22 is an electrolyte containing specified redox ions which are in a reduced state and are to be oxidized during the discharge process of a cell 12 or are in an oxidized state and are to be reduced during the charging process of a cell 12 or which are a mixture of these latter reduced ions and ions to be reduced. The positive compartment 18 contains a catholyte solution 24 in electrical communication with the positive electrode 20. The catholyte solution 24 is an electrolyte containing specified redox ions which are in an oxidized state and are to be reduced during the discharge process of a cell 12 or are in a reduced state and are to be oxidized during the charging process of the cell 12 or which are a mixture of these oxidized ions and ions to be oxidized.

The anolyte and catholyte solutions 22, 24 may be prepared in accordance with the teachings of U.S. Pat. Nos. 4,786,567, 6,143,443, 6,468,688, and 6,562,514, which are hereby incorporated by reference, or by other techniques well known in the art. The anolyte solution 22 refers to an electrolyte containing specified redox ions which are in a reduced state and are to be oxidized during the discharge process of a redox battery or are in an oxidized state and are to be reduced during the charging process of a redox battery or which are a mixture of these latter reduced ions and ions to be reduced. The catholyte solution 24 refers to an electrolyte containing specified redox ions which are in an oxidized state and are to be reduced during the discharge process of a redox battery or are in a reduced state and are to be oxidized during the charging process of the redox battery or which are a mixture of these oxidized ions and ions to be oxidized. Further, aqueous NaOH is not included within the scope of anolyte solution 22, and aqueous HCl is not included within the scope of a catholyte solution 24. In one embodiment, the anolyte solution 22 is 1M to 6M $H_2SO_4$ and includes a stabilizing agent in an amount typically in the range of from 0.1 to 20 wt % and the catholyte solution 24 is 1M to 6M $H_2SO_4$.

Each cell 12 includes an ionically conducting separator 26 disposed between the positive and negative compartments 14, 18 and in contact with the catholyte and anolyte solutions 22, 24 to provide ionic communication therebetween. The separator 26 serves as a proton exchange membrane and may include a carbon material which may or may not be purflomatorated.

Additional anolyte solution 22 is held in an anolyte reservoir 28 that is in fluid communication with the negative compartment 14 through an anolyte supply line 30 and an anolyte return line 32. The anolyte reservoir 28 may be embodied as a tank, bladder, or other container known in the art. The anolyte supply line 30 communicates with a pump 36 and a heat exchanger 38. The pump 36 enables fluid movement of the anolyte solution 22 through the anolyte reservoir 28, supply line 30, negative compartment 14, and return line 32. The pump 36 has a variable speed to allow variance in the generated flow rate. The heat exchanger 38 transfers generated heat from the anolyte solution 22 to a fluid or gas medium. The pump 36 and heat exchanger 38 may be selected from any number of known, suitable devices.

The supply line 30 includes one or more supply line valves 40 to control the volumetric flow of anolyte solution. The return line 32 communicates with a return line valves 44 that controls the return volumetric flow.

Similarly, additional catholyte solution 24 is held in a catholyte reservoir 46 that is in fluid communication with the positive compartment 18 through a catholyte supply line 48 and a catholyte return line 50. The catholyte supply line 48 communicates with a pump 54 and a heat exchanger 56. A variable speed pump 54 enables flow of the catholyte solution 22 through the catholyte reservoir 46, supply line 48, positive compartment 18, and return line 50. The supply line 48 includes a supply line valve 60 and the return line 50 includes a return line valve 62.

The negative and positive electrodes 16, 20 are in electrical communication with a power source 64 and a load 66. A power source switch 68 is disposed in series between the power source 64 and each negative electrode 16. Likewise, a load switch 70 is disposed in series between the load 66 and each negative electrode 16. One of skill in the art will appreciate that alternative circuit layouts are possible and the embodiment of FIG. 1 is provided for illustrative purposes only.

In charging, the power source switch 68 is closed and the load switch is opened. Pump 36 pumps the anolyte solution 22 through the negative compartment 14 and anolyte reservoir 28 via anolyte supply and return lines 30, 32. Simultaneously, pump 54 pumps the catholyte solution 24 through the positive compartment 18 and catholyte reservoir 46 via catholyte supply and return lines 48, 50. Each cell 12 is charged by delivering electrical energy from the power source 64 to negative and positive electrodes 16, 20. The electrical energy derives divalent vanadium ions in the anolyte solution 22 and quinvalent vanadium ions in the catholyte solution 24.

Electricity is drawn from each cell 12 by closing load switch 70 and opening power source switch 68. This causes load 66, which is in electrical communication with negative and positive electrodes 16, 20 to withdraw electrical energy. Although not illustrated, a power conversion system may be incorporated to convert DC power to AC power as needed.

A number of control parameters influence the efficiency of the system 10. A key control parameter is the temperature of the anolyte and catholyte solutions 22, 24. The temperature is influenced by ambient conditions and load requirements. Another control parameter is the pressure of the solutions 22, 24 which is influenced by flow rates, state of charge (SOC), temperature, and plant design. A further control parameter is the flow rate which is controlled through variable speed drives. Other control parameters include charging current and duration of constant current periods, as determined by SOC.

Another control parameter is hydrogen evolution. The hydrogen evolution is minimized in the control strategy and is influenced by temperature, SOC, load and rates of charge and discharge which are ramp rates. Another control parameter is the remixing of concentrations of the anolyte and catholyte solutions 22, 24 with respect to volumes. Pressure differentials develop over time as reservoirs 28, 46 have different electrolyte levels due to crossover. Concentrations also vary and system optimization must factor the remixing parameter.

Recharge and discharge periods are additional control parameters. The rate of charge and discharge impact the evolution of hydrogen. In addition, during discharge, heat is developed and the temperature of the anolyte and catholyte solutions 22, 24 is raised. Viscosity is thus affected and pump flow rates need to be adjusted accordingly. The optimal time for charge and discharge is selected within the maximum rates that the system can handle as well as within the loads requirements, i.e. time available in a day.

Figure 2:
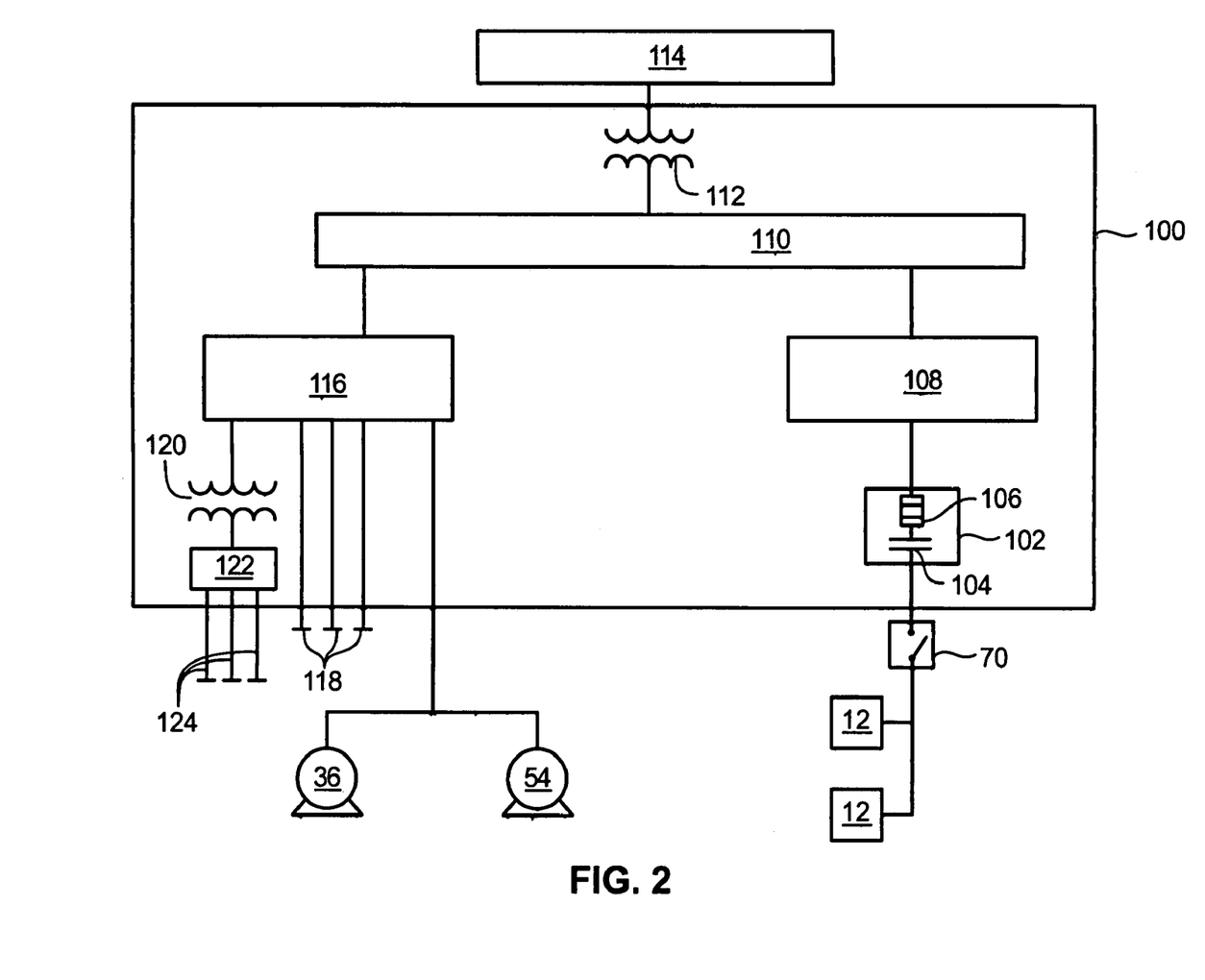
FIG. 2 is a block diagram illustrating an embodiment of a power conversion system.

Referring to FIG. 2, an interconnection of cells 12 of a VRB-ESS 10 to a PCS 100 is shown. The PCS 100 serves as the load 66 generally referenced in FIG. 1. The PCS 100 is illustrative of any number of configurations and is provided as one example. One or more cells 12 are coupled to the PCS 100 through a load switch 70. The cells 12 provide a direct current to a coupling circuit 102 that may include a capacitor 104 and diode 106 in series. The coupling circuit 100 is in communication with an inverter 108 to convert the direct current to alternating current. The inverter 108 couples to a main switchboard 110 to provide local distribution.

One or more transformers 112, such as pole mount transformers, are in electrical communication with the main switchboard 110 to step up the localized voltage for remote distribution. A distribution feeder 114 is coupled to the transformer 112 to enable long range power transmission.

A panel board 116 is coupled to the main switchboard 110 for local power distribution. This is particularly useful if the system 10 is located in a remote location with limited power access. The panel board 116 is in electrical communication with the pumps 36, 54 to power their operation. One or more power lines 118 are in communication with the panel board 116 to provide high voltage supply to one or more applications such as lighting, HVAC, and so forth. A transformer 120, in electrical communication with the panel board 112, steps down the voltage for wall outlets and delivers the voltage to a sub panel 122. The sub panel 122 is in electrical communication with one more wall outlets 124.

Figure 3:
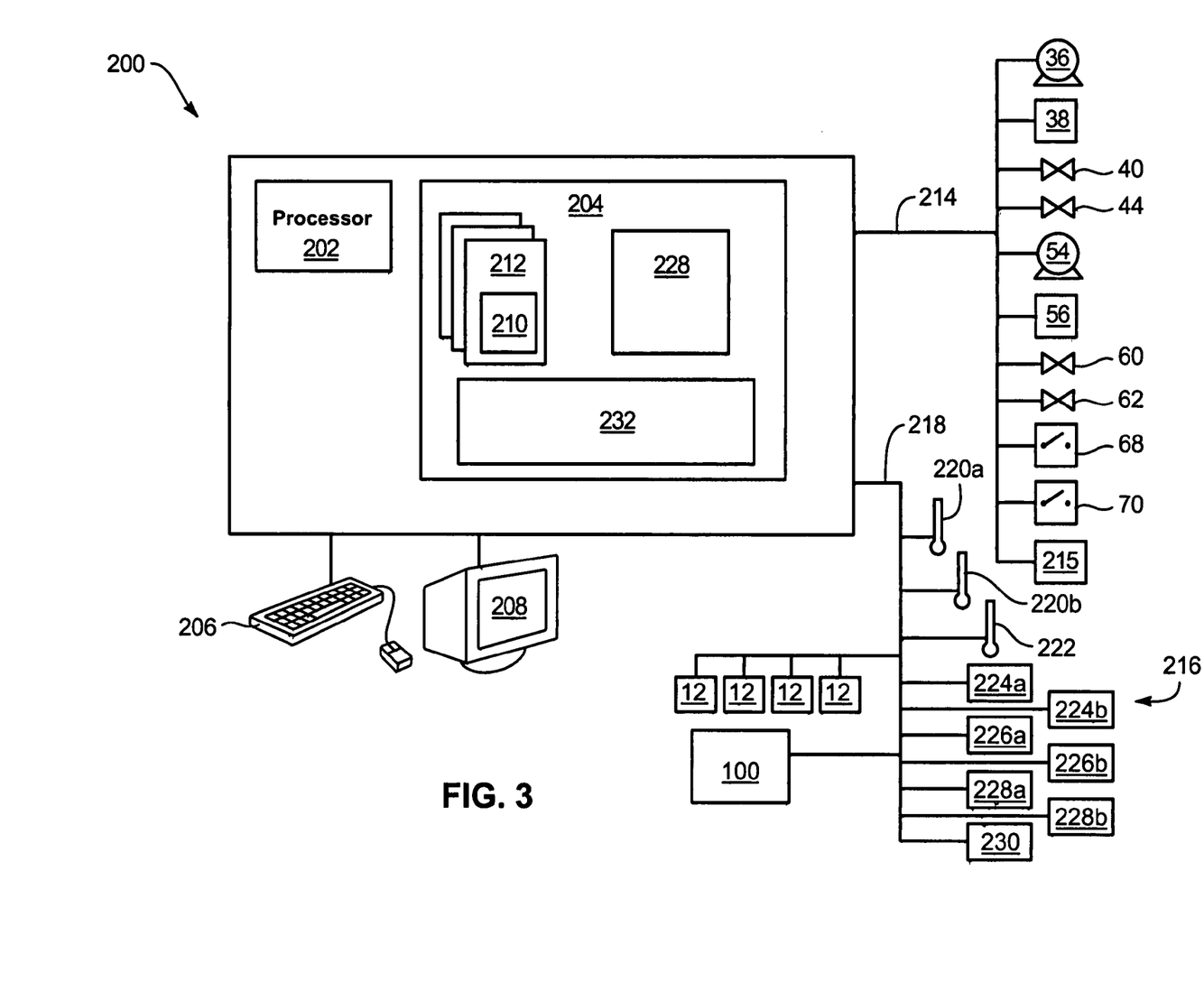
FIG. 3 is a block diagram of an embodiment of a control system.

Referring to FIG. 3, a block diagram of one embodiment of a control system 200 that interfaces with the system 10 of FIG. 1 is shown. The control system 200 may be embodied as a programmable logic computer with a processor 202 for executing applications of the present invention. The processor 202 is in electrical communication with a memory 204 that receives and stores executable applications and data. The memory 204 may be embodied in various ways and may collectively include different memory devices such as ROM, RAM, non-volatile memory, such as a magnetic hard drive, and the like. The control system 200 further includes an input 206 and an output 208 to enable user interaction.

A user enters control settings 210 into lookup tables 212 in the memory 204. The control settings 210 include real time pricing requirements, anticipated demand peak limits, and projected charge and discharge periods for a VRB-ESS 10.

The control system 200 is in communication with the various components of the system 10 through a control communications interface 214, that may be embodied as a RS485 using a MODBUS protocol. The components in electrical communication with the control system 200 include pumps 36, 54, heat exchangers 38, 56, supply valves 40, 60, return valves 44, 62, power source switch 68, and load switch 70. The control system 200 further communicates with an equalization/mix control 215 that equalizes the anolyte and catholyte solutions 22, 24 in the reservoirs 28, 46. As required, the equalization/mix control 215 increases or decreases the volume of electrolytes in the reservoirs 28, 46 to maintain approximate equalization of anolyte and catholyte solutions 22, 24. The equalization/mix control 215 may provide additional anolyte and catholyte solution 22, 24 from auxiliary reservoirs (not show) or reduce solution 22, 24 through drains (not shown).

The control system 200 communicates with sensors 216 through a monitor communications interface 218 that may be similar to the control communications interface 214. The sensors 216 are disposed within the system 10 to monitor performance. The sensors 216 may include anolyte and catholyte thermometers 220a, 220b to monitor electrolyte temperatures. The anolyte and catholyte thermometers 220a, 220b are in contact with the anolyte and catholyte solutions 22, 24 and may be disposed at any number of locations throughout the VRB-ESS 10. The sensors 216 further include an ambient thermometer 222 to monitor the external ambient temperature. Electrolyte level sensors 224a, 224b are disposed in the anolyte reservoir 28 and the catholyte reservoir 46 respectively to monitor levels of anolyte and catholyte solutions 22, 24. Anolyte and catholyte flow rate sensors 226a, 226b are disposed in the supply and/or return lines 30, 32, 48, 50 to measure volumetric flow rate of the anolyte and catholyte solutions 22, 24. Anolyte and catholyte pressure sensors 228a, 228b are disposed in the system 10 to measure the pressure of the anolyte and catholyte solutions 22, 24 in the supply and/or return lines 30, 32, 48, 50. One or more emission sensors 230 are disposed in the system 10 to monitor the quantity of H2 emissions generated by the cells.

The communications interface 218 is further in electrical communication with the cells 12 to determine the Voc (open-circuit voltage) or to a reference cell inside the cell stack 12 of the system 10. The communications interface 218 is also in electrical communication with the PCS 100 to receive signals indicative of voltage and current delivered to and received from the PCS 100. All sensor input is collectively referred to as operational data 228 which is relayed to the control system 200 and stored in the memory 204.

The control system 200 includes a control module 232, resident in memory 204, that controls and monitors system performance. The control module 232 monitors the operational data 228 for enhancements and determination of changes in performance. The control module 232 is an algorithmic application that evaluates the dynamic conditions of the system 10 by reviewing the operational data 228 and adjusts the control variables of system components to maximize the efficiency within the given design requirements. The control module 232 takes into account the effects of hysterisis and lag times in terms of response.

In operation, meeting grid demands is a dynamic situation. As load increases, the control system 200 meets the demand by increasing pump speeds to supply more power. Accordingly, as load decreases, the pump speeds are decreased. Furthermore, the more charge in the electrolyte solution, the slower the pump speed to meet a demand. Conversely, the less charge in an electrolyte solution, the faster the pump speed to meet a demand. In charging a VRB, the less charge in the electrolyte, the slower the pump speed needed to charge the electrolyte, whereas the greater charge in the electrolyte the faster the pump speed needed to charge the electrolyte. Furthermore, different pump speeds are employed based on the different types of electrolytes and concentrations.

Figure 4:
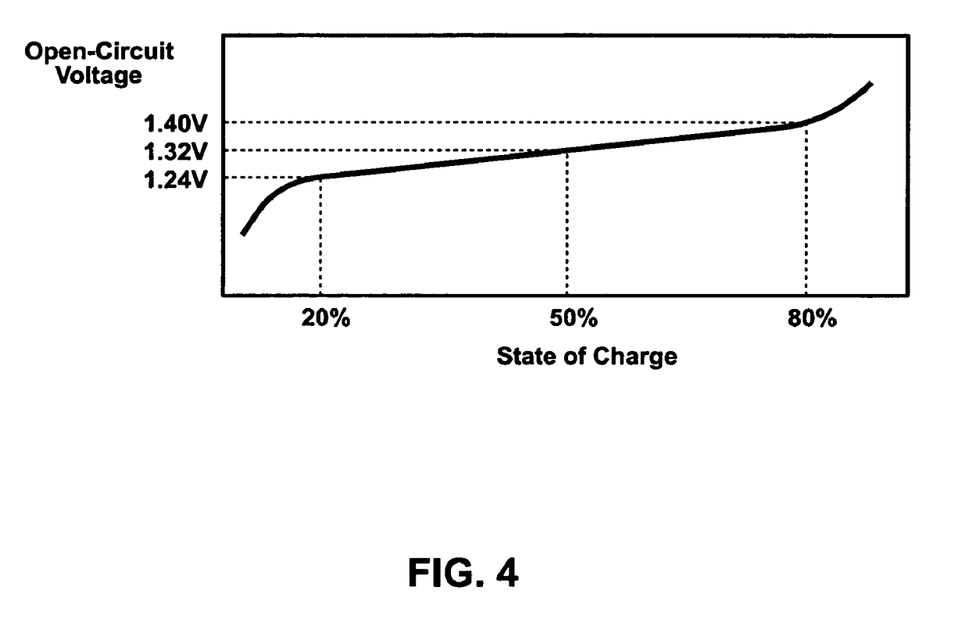
FIG. 4 is a graph illustrating a state of charge curve.
Figure 5:
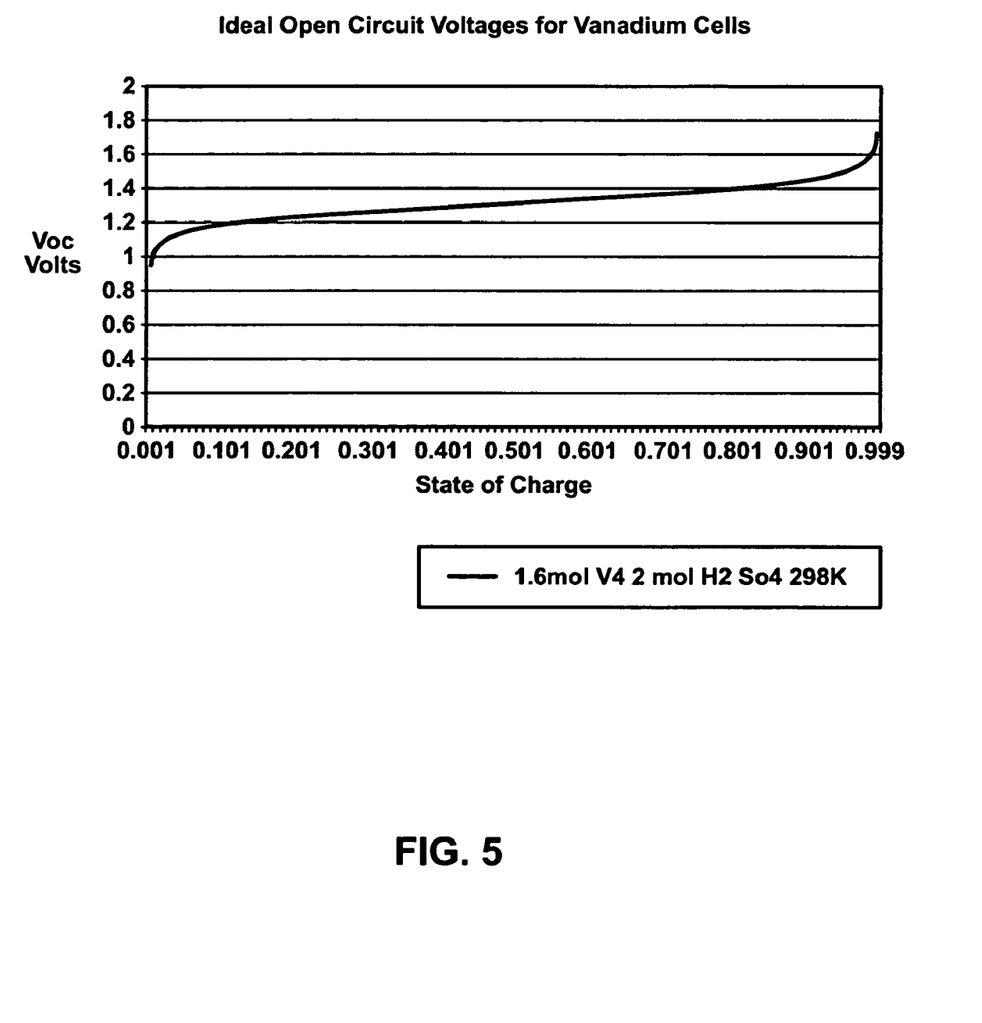
FIG. 5 is graph illustrating a state of charge curve for ideal open circuit voltages.

The control module 232 employs the following control strategy equation:

$$SOC = (A + B*Voc^C)/(D + Voc^C),$$

where SOC is the state-of-charge and Voc is the open-circuit voltage. A, B, C, and D are constants. The control strategy equation defines a fundamental relationship between Voc and the SOC. Referring to FIG. 4, a graph is shown illustrating one example of the shape of a plot of Voc as a function of SOC. Referring to FIG. 5, a graph illustrating an ideal Voc as a function of SOC is shown. The relationship may also be confirmed against a reference cell.

The variables, A, B, C, and D are determined by physical design factors such as the pressure of cell stacks, ambient temperature, internal temperature, length of pipes, molar concentrations of electrolyte, and other design and operating factors. Although the plot shown in FIG. 4 may vary and shift based on variables, the fundamental curve shape remains. The control module 232 uses the above equation to calculate the SOC based upon the open-circuit voltage Voc. A unique consideration of the present invention is that not all variables need to be actively controlled. Some variables are dependent upon others with definite time lags total system 10 operates as a feedback mechanism.

The flow rates of the anolyte and catholyte solutions 22, 24 may be varied to affect the Voc, SOC, and, consequently, power output. The control system 200 operates the pumps 36, 54 and heat exchangers 38, 56 to vary pump speeds and temperature and control the flow rate in the supply and return lines 30, 32, 48, 50. The control system 200 can control flow rates to yield a constant power output, a constant current or a constant voltage. The control module 232 monitors the generated Voc and SOC to determine if the system 10 is performing efficiently. If performance is below expectations, the control module 232 alters key parameters of pump speed and temperature to improve performance. In this manner, the control module 232 adapts and improves control of the system 10.

In discharging the system 10, the control system 200 operates the pumps 36, 54 and heat exchangers 38, 56 to adjust the flow rate to optimize efficiencies and available power. With SOC at higher states and when discharging, the anolyte and catholyte solutions 22, 24 are pumped slower so that more charge can be removed on each pass. With SOC at lower states and when discharging, the pumping speeds are increased to the maximum allowable under pressure rating limits.

As the anolyte and catholyte solutions 22, 24 discharge, they become more viscous so flow rates can increase without equivalent pressure build up. To extract more power down to 10 percent SOC, it is necessary to increase the flow rate. When discharging, there is an exothermic reaction when the anolyte and catholyte solution 22, 24 states change. This typically results in a rising temperature of the electrolyte, unevenly from positive to negative sides. Temperature limits are typically set at a minimum of 5 Celsius and at a maximum of 40 Celsius. The control system 200 determines lead and lag times associated with each charge/discharge cycle and establishes set points. The set points determine when the control system 200 operates the heat exchangers 38, 56 to extract heat from the anolyte and catholyte solutions 22, 24. Ambient conditions impact this process so that the condition is continuously dynamic.

During charging of the system 10, the control system 200 controls the pumping speed at the extremes of the SOC in order to optimize the power input and output and to enhance round trip efficiency. With SOC at higher states and when charging, faster pumping prevents charged electrolyte from being trapped and developing heat and gas emission and potentially $V_2O_5$. With SOC at lower states and when charging, slower pumping allows maximum energy transfer each pass to reduce gas emission.

By use of emission sensors 230, the control system 200 monitors any hydrogen gas evolution under bad conditions within each cell 12 during the charging process. In general, $H_2$ gas evolves during the charging cycle. Gas evolution is generally higher at a higher SOC and the control system determines the optimal performance criteria. If excess $H_2$ is produced, the efficiency drops off. During charging, the temperatures of the anolyte and catholyte solutions 22, 24 do not rise and may decline depending upon starting points and rates of charge.

Figure 6:
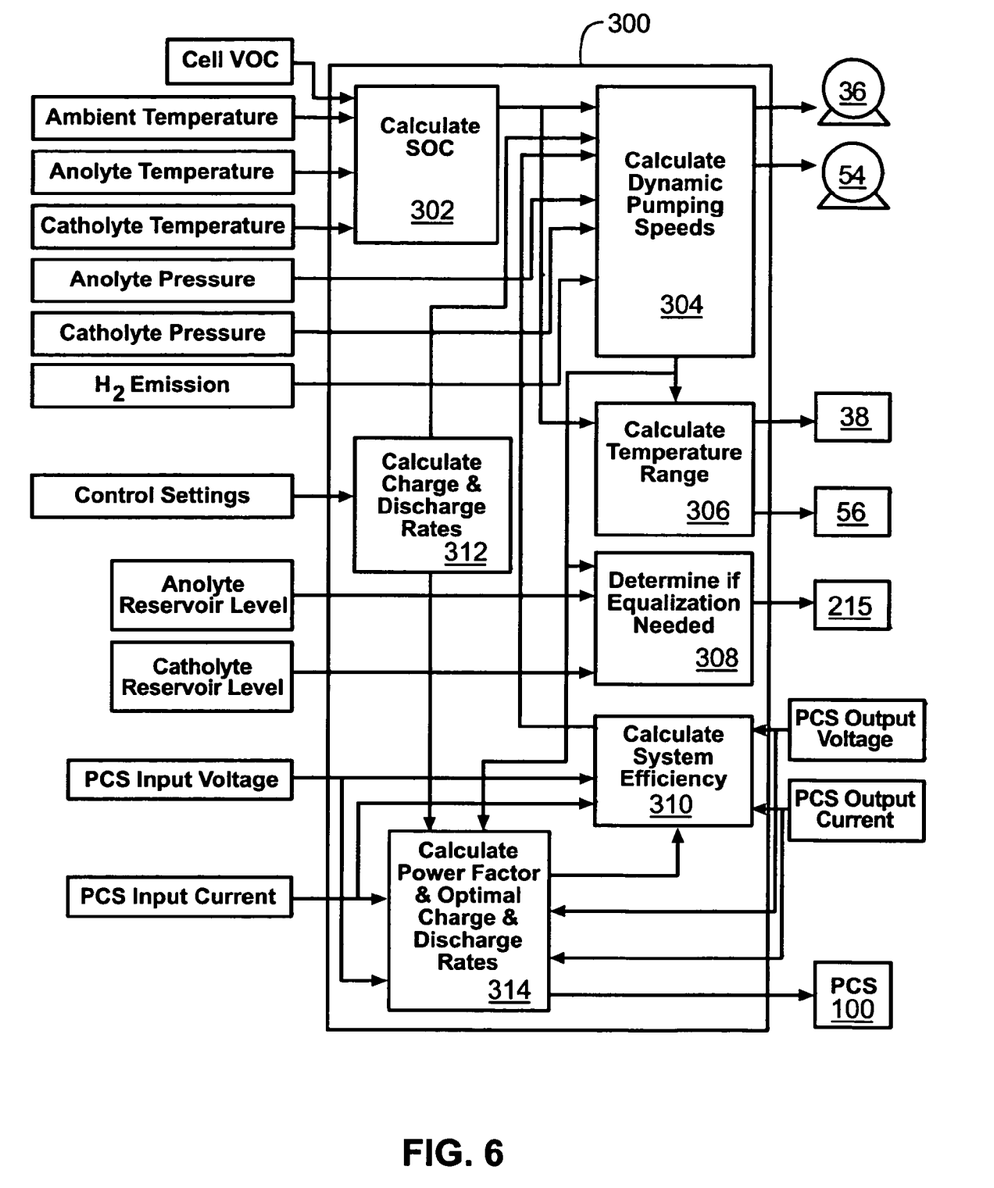
FIG. 6 is a block diagram illustrating a control methodology for use in the present invention.

Referring to FIG. 6, a block diagram illustrating a specific control methodology 300 performed by the control module 232 is shown. In a first process, the control module calculates 302 the SOC of the system 10. In the previously discussed equation, SOC is calculated from the Voc of the cells 12 or reference cell.

Next the control module 232 calculates 304 the dynamic pumping speed for each pump 36, 54. Pumping speed is determined by the calculated 302 SOC, and anolyte and catholyte pressures. Furthermore, pumping speed is adjusted by the calculated 312 charge and discharge rates, calculated 310 system efficiency, and cell H2 emissions. The optimal pumping speeds are transmitted from the control system 200 to each pump 36, 54.

The control module 232 further calculates 306 an optimal temperature range for the anolyte and catholyte solutions 22, 24 based on the calculated 302 SOC and calculated 304 pumping speeds. The control module 232 operates the heat exchangers 38, 56 in accordance with the ambient and electrolyte temperature range. During charge and discharge, heat is generated and is measured to maintain an optimal range. As needed, heat is removed to maintain an optimal temperature range. In sufficiently cold environments, no heat exchangers are required as the ambient air provides the needed cooling.

During operation, the control module 232 monitors the levels of the anolyte and catholyte solutions 22, 24 and determines 308 if equalization of reservoir levels is needed. The control module 232 operates the equalization/mix control 215 to adjust the reservoirs 28, 46 as needed.

The control module 232 calculates 310 system efficiency based on a ratio of power output versus power input. System efficiency is determined from voltage and current generated by the cells 12, calculated 314 power factor, and voltage and current delivered to the PCS 100. System efficiency is used in calculating 304 the pump speeds.

The control module 232 accesses the control settings 210 to retrieve available charge and discharge periods. The control module 232 then calculates 312 charge and discharge rates to minimize demand peaks and to optimize efficiency. The charge and discharge rates are calculated initially and then may be updated and calculated under dynamic demand conditions. The charge and discharge rates are used in calculating 304 the pump speeds.

The control module 232 calculates 314 a power factor based on voltage and current received and delivered to and from the PCS 100. The control module 232 further calculates 314 the optimal charge and discharge rates based on the calculated 312 charge and discharge rates. The control module 232 may modify the projected charge and discharge rates based on prior rates. The control module 232 may communicate the charge and discharge rates to the PCS 100 for anticipated performance.

In operation, meeting grid demands is a dynamic situation. As load increases, the PCS 100 meets the demand by increasing pump speeds to supply more power depending on the SOC. Accordingly, as load decreases, the pump speeds are decreased. Furthermore, the more charge in the electrolyte solution, the slower the pump speed to meet a demand. Conversely, the less charge in an electrolyte solution, the faster the pump speed to meet a demand. In charging a VRB, the less charge in the electrolyte, the slower the pump speed needed to charge the electrolyte, whereas the greater charge in the electrolyte the faster the pump speed needed to charge the electrolyte.

The processes disclosed in the methodology 300 frequently operate in parallel and, as illustrated, interrelate with one another. The system's dynamic conditions require constant monitoring of system variables, such as Voc, pressure, temperature, and so forth. The control module 232 continuously updates the pump speeds, electrolyte temperatures, and reservoir levels to optimize performance. The control module 232 may be implemented in various ways including a neural networks or more simply with standard logic programming.

It will be obvious to those having skill in the art that many changes may be made to the details of the above-described embodiments without departing from the underlying principles of the invention. The scope of the present invention should, therefore, be determined only by the following claims.

The invention claimed is:

1. A rechargeable energy storage system configured to couple to an electrical grid, comprising:
   a vanadium redox battery energy storage system, including:
      a vanadium redox battery cell having anolyte and catholyte solutions,
      an anolyte line coupled to the battery cell to carry anolyte solution,
      an anolyte reservoir coupled to the anolyte line and having anolyte solution,
   an anolyte variable speed pump coupled to the anolyte line to provide an anolyte flow rate,
      a catholyte line coupled to the battery cell to carry catholyte solution,
      a catholyte reservoir coupled to catholyte line and having catholyte solution,
      a catholyte variable speed pump coupled to the catholyte line to provide a catholyte flow rate,
      an anolyte thermometer in contact with the anolyte solution, and
      a catholyte thermometer in contact with the catholyte solution; and
   a control system in electrical communication with the vanadium redox battery cell to receive signals indicative of an open-circuit voltage of the vanadium redox battery cell, the control system further configured to be in electrical communication with an electrical grid and to determine grid conditions, the control system further in electrical communication with the anolyte and catholyte variable speed pumps and the anolyte and catholyte thermometers, the control system including,
      a processor, and
      a computer-readable medium in electrical communication with the processor and having a control program stored thereon, the control program comprising computer instructions executable on the processor for performing the method of,
      receiving anolyte and catholyte solution temperature signals from the anolyte and catholyte thermometers,
      calculating a state-of-charge for the vanadium redox battery cell from the open-circuit voltage and anolyte and catholyte solution temperature signals,
      calculating charge and discharge rates of the vanadium redox battery energy storage system,
      calculating anolyte and catholyte pump speeds from the state-of-charge, the charge and discharge rates, and grid conditions, and
      transmitting signals to the anolyte and catholyte variable speed pumps to control pump speed.

2. The rechargeable energy storage system of claim 1, wherein the vanadium redox battery energy storage system further includes an anolyte pressure sensor and a catholyte pressure sensor to provide anolyte and catholyte pressure signals, the anolyte and catholyte pressure sensors in electrical communication with the control system, and wherein calculating anolyte and catholyte pump speeds is further determined by anolyte and catholyte pressure signals.

3. The rechargeable energy storage system of claim 1, wherein the vanadium redox battery energy storage system further includes an anolyte heat exchanger coupled to the anolyte line and a catholyte heat exchanger coupled to the catholyte line, the anolyte and catholyte heat exchangers in electrical communication with the control system, and wherein the method further includes calculating an anolyte temperature range and a catholyte temperature range from the state-of-charge and the anolyte and catholyte pump speeds.

4. The rechargeable energy storage system of claim 1, wherein the vanadium redox battery energy storage system further includes an ambient thermometer in electrical communication with the control system to provide an ambient temperature, and wherein calculating the state-of-charge is further determined by ambient temperature.

5. The rechargeable energy storage system of claim 1, wherein the vanadium redox battery energy storage system further includes a hydrogen emission sensor to monitor the quantity of hydrogen emissions in the anolyte solution and the catholyte solution and in electrical communication with the control system, and wherein calculating anolyte and catholyte pump speeds is further determined by the quantity of hydrogen emissions.

6. The rechargeable energy storage system of claim 1, wherein the method further includes calculating optimal charge and discharge rates derived from the charge and discharge rates.

7. The rechargeable energy storage system of claim 1, wherein the method further includes calculating a system efficiency for the vanadium redox battery energy storage system and wherein calculating anolyte and catholyte pump speeds is further determined by the system efficiency.

8. The rechargeable energy storage system of claim 1, wherein the vanadium redox battery energy storage system includes an anolyte reservoir level sensor coupled to the anolyte reservoir and a catholyte reservoir level sensor coupled to the catholyte reservoir, the anolyte and catholyte reservoir level sensors in electrical communication with the control system, and wherein the method further includes determining if equalization of the anolyte reservoir and catholyte reservoir is required.

9. The rechargeable energy storage system of claim 1, wherein the method further includes calculating a power factor derived from input voltage and input current to the vanadium redox battery energy storage system and output voltage and output current from the vanadium redox battery energy storage system.

10. A control system for electrically communicating with a vanadium redox battery energy storage system configured to couple to an electrical grid, the control system configured to receive signals indicative of an open-circuit voltage of a vanadium redox battery cell, the control system further for determining grid conditions, and for electrically communicating with anolyte and catholyte variable speed pumps and the anolyte and catholyte thermometers of the vanadium redox battery energy storage system, the control system comprising:
- a processor; and
- a computer-readable medium in electrical communication with the processor and having a control program stored thereon, the control program comprising computer instructions executable on the processor for performing the method of,
- receiving anolyte and catholyte solution temperature signals from the anolyte and catholyte thermometers,
- calculating a state-of-charge for the vanadium redox battery cell from the open-circuit voltage and anolyte and catholyte solution temperature signals,
- calculating charge and discharge rates of the vanadium redox battery energy storage system,
- calculating anolyte and catholyte pump speeds from the state-of-charge, the charge and discharge rates, and grid conditions, and
- transmitting signals to the anolyte and catholyte variable speed pumps to control pump speed.

11. The control system of claim 10, wherein the method further includes,
- receiving anolyte and catholyte pressure signals from the vanadium redox battery energy storage system, and
- wherein calculating anolyte and catholyte pump speeds is further determined by the anolyte and catholyte pressure signals.

12. The control system of claim 10, wherein the method further includes,
- calculating an anolyte temperature range and a catholyte temperature range from the state-of-charge and the anolyte and catholyte pump speeds, and
- transmitting the anolyte and catholyte temperature ranges to the vanadium redox battery energy storage system.

13. The control system of claim 10, wherein the method further includes,
- receiving an ambient temperature signal, and
- wherein calculating the state-of-charge is further determined by the ambient temperature signal.

14. The control system of claim 10, wherein the method further includes,
- receiving a hydrogen emission signal indicative of the quantity of hydrogen emissions generated in the anoltye and catholyte solution, and
- wherein calculating anolyte and catholyte pump speeds is further determined by the quantity of hydrogen emissions.

15. The control system of claim 10, wherein the method further includes calculating optimal charge and discharge rates derived from the charge and discharge rates.

16. The control system of claim 10, wherein the method further includes,
- calculating a system efficiency for the vanadium redox battery energy storage system, and
- wherein calculating anolyte and catholyte pump speeds is further determined by the system efficiency.

17. The control system of claim 10, wherein the method further includes,
- receiving anolyte and catholyte reservoir level signals, and
- determining if equalization of the anolyte reservoir and catholyte reservoir is required.

18. The control system of claim 10, wherein the method further includes calculating a power factor derived from input voltage and input current to the vanadium redox battery energy storage system and output voltage and output current from the vanadium redox battery energy storage system.

* * * * *